US012647055B2

(12) United States Patent
Arisawa et al.

(10) Patent No.: US 12,647,055 B2
(45) Date of Patent: Jun. 2, 2026

(54) POWER CONVERSION APPARATUS, MOTOR DRIVE APPARATUS, AND REFRIGERATION CYCLE APPLICATION DEVICE

(71) Applicant: Mitsubishi Electric Corporation, Tokyo (JP)

(72) Inventors: Koichi Arisawa, Tokyo (JP); Shuta Ishikawa, Tokyo (JP); Takaaki Takahara, Tokyo (JP); Tomohiro Kutsuki, Tokyo (JP); Haruka Matsuo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 239 days.

(21) Appl. No.: 18/705,046

(22) PCT Filed: Dec. 8, 2021

(86) PCT No.: PCT/JP2021/045109
§ 371 (c)(1),
(2) Date: Apr. 26, 2024

(87) PCT Pub. No.: WO2023/105676
PCT Pub. Date: Jun. 15, 2023

(65) Prior Publication Data
US 2025/0219560 A1 Jul. 3, 2025

(51) Int. Cl.
*H02M 7/5395* (2006.01)
*F25B 31/02* (2006.01)
(Continued)

(52) U.S. Cl.
CPC .............. *H02P 21/05* (2013.01); *F25B 31/02* (2013.01); *H02P 21/22* (2016.02); *H02P 27/12* (2013.01)

(58) Field of Classification Search
CPC ... H02M 7/5395; H02M 1/0012; H02P 21/05; H02P 21/22; F25B 31/02
See application file for complete search history.

(56) References Cited

U.S. PATENT DOCUMENTS

2023/0108457 A1* 4/2023 Gopalan ............. H02M 1/0012
363/44
2024/0380337 A1* 11/2024 Hara ................... H02M 7/5395

FOREIGN PATENT DOCUMENTS

JP          H07-071805 A      3/1995
JP          2009-232591 A     10/2009
JP          2021-158874 A     10/2021

OTHER PUBLICATIONS

International Search Report of the International Searching Authority mailed Feb. 15, 2022 in corresponding International Application No. PCT/JP2021/045109 (and English translation).

* cited by examiner

*Primary Examiner* — Cortez M Cook
(74) *Attorney, Agent, or Firm* — Posz Law Group, PLC

(57) ABSTRACT

A power conversion apparatus includes: a rectifying unit that rectifies a power-supply voltage applied from a commercial power supply; a capacitor connected to an output end of the rectifying unit; an inverter that converts DC power output from the capacitor into AC power and outputs the AC power to a device on which a motor is mounted; a voltage detecting unit that detects the power-supply voltage; and a control unit that performs pulsation compensation control of reducing a pulsatile component of a capacitor current that is a charge and discharge current of the capacitor on the basis of a detection value by the voltage detecting unit.

8 Claims, 10 Drawing Sheets

(51) Int. Cl.
H02P 21/05 (2006.01)
H02P 21/22 (2016.01)
H02P 27/12 (2006.01)

POWER-SUPPLY FREQUENCY [Hz]

FIG.5

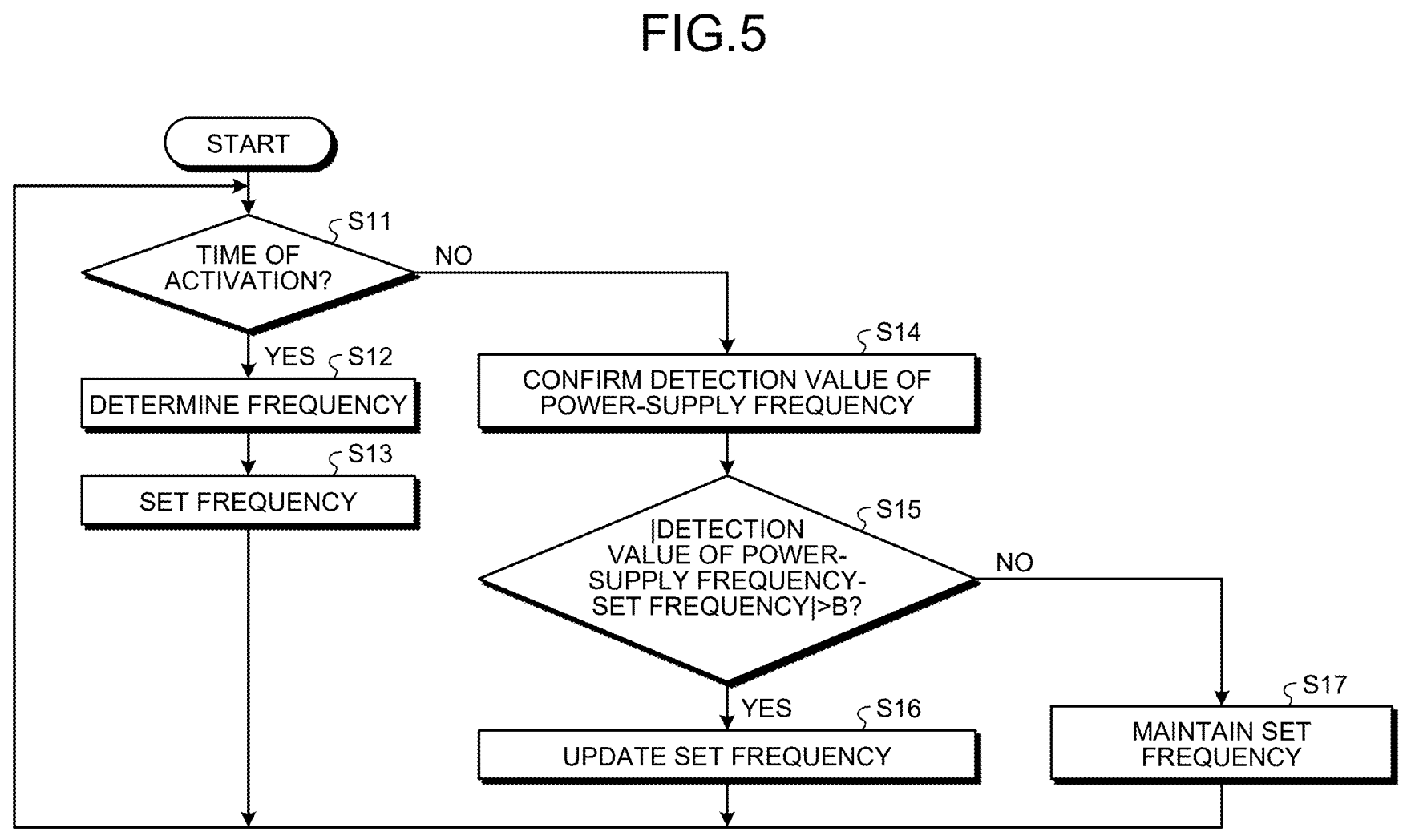

START

S11 — TIME OF ACTIVATION?

NO → S14 — CONFIRM DETECTION VALUE OF POWER-SUPPLY FREQUENCY → S15 — |DETECTION VALUE OF POWER-SUPPLY FREQUENCY-SET FREQUENCY|>B?

NO → S17 — MAINTAIN SET FREQUENCY

YES → S16 — UPDATE SET FREQUENCY

YES → S12 — DETERMINE FREQUENCY → S13 — SET FREQUENCY

FIG.9

POWER CONVERSION APPARATUS, MOTOR DRIVE APPARATUS, AND REFRIGERATION CYCLE APPLICATION DEVICE

CROSS REFERENCE TO RELATED APPLICATION

This application is a U.S. national stage application of PCT/JP2021/045109 filed on Dec. 8, 2021, the contents of which are incorporated herein by reference.

FIELD

The present disclosure relates to a power conversion apparatus that converts AC power into desired power, a motor drive apparatus, and a refrigeration cycle application device.

BACKGROUND

Conventionally, there is a power conversion apparatus that converts AC power supplied from an AC power supply into desired AC power and supplies the AC power to a load such as an air conditioner. For example, Patent Literature 1 below discloses a technique in which a power conversion apparatus that is a control apparatus of an air conditioner rectifies AC power supplied from an AC power supply by a diode stack that is a rectifying unit, further converts the power smoothed by a smoothing capacitor into desired AC power by an inverter including a plurality of switching elements, and outputs the AC power to a compressor motor that is a load.

CITATION LIST

Patent Literature

Patent Literature 1: Japanese Patent Application Laid-open No. H7-71805

SUMMARY OF INVENTION

Problem to be Solved by the Invention

However, according to the above-described conventional technique, since a large pulsating current flows through the smoothing capacitor, there has been a problem that aged deterioration of the smoothing capacitor is accelerated. For this problem, a method is conceivable of reducing a ripple change in the capacitor voltage by increasing the capacitance of the smoothing capacitor, or using a smoothing capacitor having a large tolerance of deterioration due to ripples. However, such a method has a problem that the cost of the capacitor component increases, and the size of the apparatus increases.

The present disclosure has been made in view of the above, and an object thereof is to obtain a power conversion apparatus capable of preventing an increase in size of the apparatus while reducing deterioration of a smoothing capacitor.

Means to Solve the Problem

To solve the above problem and achieve the object, a power conversion apparatus according to the present disclosure comprises: a rectifying unit; a capacitor connected to an output end of the rectifying unit; an inverter connected across the capacitor; a first detecting unit; and a control unit. The rectifying unit rectifies a power-supply voltage applied from an AC power supply. The inverter converts DC power output from the capacitor into AC power and outputs the AC power to a device on which a motor is mounted. The first detecting unit detects the power-supply voltage. The control unit performs pulsation compensation control of reducing a pulsatile component of a capacitor current that is a charge and discharge current of the capacitor on a basis of a detection value by the first detecting unit.

Effects of the Invention

The power conversion apparatus according to the present disclosure has an effect of preventing an increase in size of the apparatus while reducing deterioration of a smoothing capacitor.

BRIEF DESCRIPTION OF DRAWINGS

FIG. 5 is a flowchart for explaining frequency setting processing performed inside the control unit according to the first embodiment.

FIG. 9 is a block diagram illustrating a configuration example of a control unit included in the power conversion apparatus according to the second embodiment.

DESCRIPTION OF EMBODIMENTS

Hereinafter, a description will be given of a power conversion apparatus, a motor drive apparatus, and a refrigeration cycle application device according to embodiments of the present disclosure in detail with reference to the accompanying drawings.

First Embodiment

Figure 1:
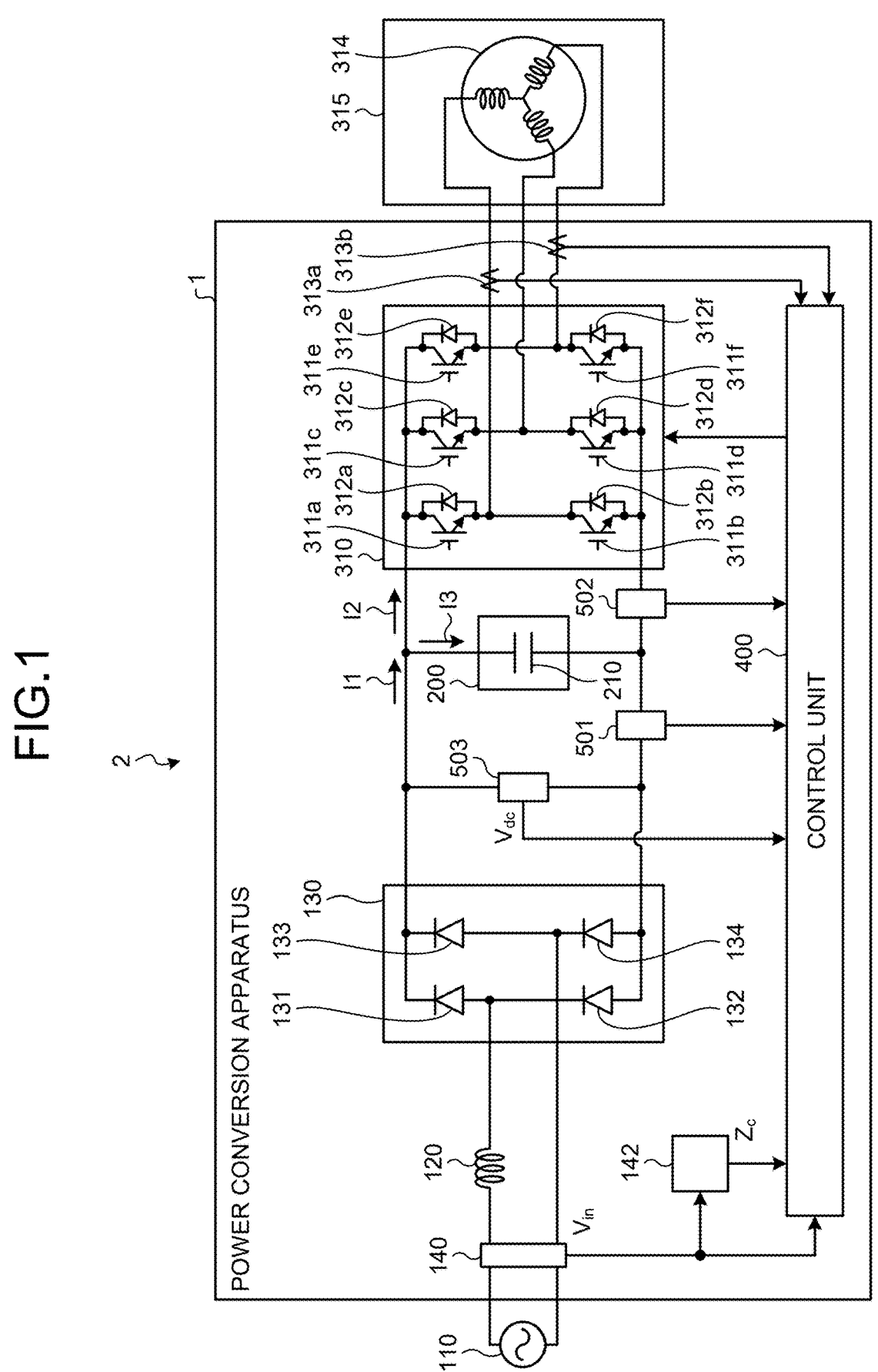
FIG. 1 is a diagram illustrating a configuration example of a power conversion apparatus according to a first embodiment.

FIG. 1 is a diagram illustrating a configuration example of a power conversion apparatus 1 according to a first embodiment. In FIG. 1, the power conversion apparatus 1 is connected to a commercial power supply 110 and a compressor 315. The commercial power supply 110 is an example of an AC power supply, and the compressor 315 is an example of a device referred to in the first embodiment. A motor 314 is mounted on the compressor 315. The power conversion apparatus 1 and the motor 314 included in the compressor 315 constitute a motor drive apparatus 2.

The power conversion apparatus 1 includes a voltage detecting unit 140, a zero-cross detecting unit 142, a reactor 120, a rectifying unit 130, current detecting units 501 and 502, a voltage detecting unit 503, a smoothing unit 200, an inverter 310, current detecting units 313a and 313b, and a control unit 400.

The reactor 120 is connected between the commercial power supply 110 and the rectifying unit 130. The rectifying unit 130 includes a bridge circuit including rectifying elements 131 to 134. The rectifying unit 130 rectifies and outputs a power-supply voltage $V_{in}$ applied from the commercial power supply 110. The rectifying unit 130 performs full-wave rectification.

The smoothing unit 200 is connected to an output end of the rectifying unit 130. The smoothing unit 200 includes a capacitor 210 as a smoothing element, and smooths a rectified voltage output from the rectifying unit 130.

The capacitor 210 is, for example, an electrolytic capacitor or a film capacitor. The capacitor 210 is connected to the output end of the rectifying unit 130. The capacitor 210 has a capacitance according to a degree of smoothing the rectified voltage. By this smoothing, a voltage generated in the capacitor 210 does not have a full-wave rectified waveform shape of the rectified voltage, but has a waveform shape in which a voltage ripple according to a frequency of the commercial power supply 110 is superimposed on a DC component, and does not ripple greatly. Regarding a frequency of the voltage ripple, a component twice the frequency of the power-supply voltage $V_{in}$ is a main component in a case where the commercial power supply 110 has a single phase, and a component six times the frequency of the power-supply voltage is a main component in a case where the commercial power supply 110 has three phases. In a case where power input from the commercial power supply 110 and power output from the inverter 310 do not change, an amplitude of the voltage ripple is determined by the capacitance of the capacitor 210. The amplitude of the voltage ripple is, for example, a voltage in which a voltage of the capacitor 210 ripples in a range in which a maximum value of the voltage ripple is less than twice a minimum value.

The voltage detecting unit 140 detects the power-supply voltage $V_{in}$, and outputs a detection value of the detected power-supply voltage $V_{in}$ to the control unit 400 and the zero-cross detecting unit 142. The zero-cross detecting unit 142 generates a zero-cross signal $Z_c$ according to the power-supply voltage $V_{in}$, and outputs the generated zero-cross signal $Z_c$ to the control unit 400. For example, the zero-cross signal $Z_c$ is a signal that outputs a "High" level when the power-supply voltage $V_{in}$ has a positive polarity, and is a signal that outputs a "Low" level when the power-supply voltage $V_{in}$ has a negative polarity. Note that these levels may be reversed. The detection value of the power-supply voltage $V_{in}$ and the zero-cross signal Zc are input to the control unit 400.

The current detecting unit 501 detects a rectified current I1 flowing out from the rectifying unit 130, and outputs a detection value of the detected rectified current I1 to the control unit 400. The current detecting unit 502 detects an inverter input current I2 that is a current flowing into the inverter 310, and outputs a detection value of the detected inverter input current I2 to the control unit 400. The voltage detecting unit 503 detects a capacitor voltage $V_{dc}$ that is a voltage of the capacitor 210, and outputs a detection value of the detected capacitor voltage $V_{dc}$ to the control unit 400. The voltage detecting unit 503 can be used as a detecting unit that detects a power state of the capacitor 210.

The inverter 310 is connected across the smoothing unit 200, that is, the capacitor 210. The inverter 310 includes switching elements 311a to 311f and freewheeling diodes 312a to 312f. The inverter 310 turns on and off the switching elements 311a to 311f by control of the control unit 400, converts DC power output from the rectifying unit 130 and the smoothing unit 200 into AC power having a desired amplitude and phase, and outputs the AC power to the compressor 315 that is a device on which the motor 314 is mounted.

The current detecting units 313a and 313b each detect a current value of one phase among three-phase motor currents output from the inverter 310 to the motor 314. Detection values by the current detecting units 313a and 313b are input to the control unit 400. On the basis of the detection values of the currents of any two phases detected by the current detecting units 313a and 313b, the control unit 400 obtains a current of the remaining one phase by calculation.

The motor 314 mounted on the compressor 315 rotates according to the amplitude and phase of the AC power supplied from the inverter 310, and performs compression operation. In a case where the compressor 315 is a hermetic compressor used in an air conditioner or the like, load torque of the compressor 315 can be regarded as a constant torque load in many cases.

Note that FIG. 1 illustrates a case where motor winding in the motor 314 is Y connection, but the present invention is not limited to this example. The motor winding of the motor 314 may be Δ connection or may have a specification capable of switching between Y connection and Δ connection.

In addition, in the power conversion apparatus 1, the configuration and arrangement of each unit illustrated in FIG. 1 are an example, and the configuration and arrangement of each unit are not limited to the example illustrated in FIG. 1. For example, the reactor 120 may be disposed at a subsequent stage of the rectifying unit 130. In addition, the power conversion apparatus 1 may include a boosting unit, or the rectifying unit 130 may have a function of the boosting unit. Note that, in this description, the voltage detecting unit 140 that detects the power-supply voltage $V_{in}$ may be referred to as a "first detecting unit". In addition, in this description, at least one of the voltage detecting unit 503 that detects the capacitor voltage $V_{dc}$, the current detecting unit 501 that detects the rectified current I1, or the current detecting unit 502 that detects the inverter input current I2 may be referred to as a "second detecting unit".

The control unit 400 acquires the detection value of the power-supply voltage $V_{in}$ detected by the voltage detecting unit 140 and the zero-cross signal $Z_c$ generated by the zero-cross detecting unit 142. In addition, the control unit 400 acquires the detection value of the rectified current I1 detected by the current detecting unit 501, the detection value of the inverter input current I2 detected by the current detecting unit 502, and the detection value of the capacitor voltage $V_{dc}$ detected by the voltage detecting unit 503. In addition, the control unit 400 acquires the detection values of the motor currents detected by the current detecting units 313a and 313b. The control unit 400 uses the detection values detected by the respective detecting units to control operation of the inverter 310, specifically, on/off of the switching elements 311a to 311f included in the inverter 310.

In addition, the control unit 400 controls the operation of the inverter 310 so that the AC power including pulsation according to pulsation of power flowing from the rectifying unit 130 into the capacitor 210 of the smoothing unit 200 is output from the inverter 310 to the compressor 315. The pulsation according to the pulsation of the power flowing into the capacitor 210 of the smoothing unit 200 is, for example, pulsation that fluctuates depending on a frequency of the pulsation of the power flowing into the capacitor 210 of the smoothing unit 200 or the like. As a result, the control unit 400 reduces the capacitor current I3 that is a charge and discharge current of the capacitor 210. The control unit 400 performs control so that any of a speed, a voltage, and a current of the motor 314 is in a desired state. Note that the control unit 400 does not have to use all the detection values acquired from the respective detecting units, and can perform control using some detection values.

In a case where the motor 314 is used for driving the compressor 315 and the compressor 315 is a hermetic compressor, it is often structurally and cost-effectively difficult to attach a position sensor that detects a rotor position to the motor 314. For this reason, the control unit 400 controls the motor 314 without a position sensor. There are two types of position sensorless control methods for the motor 314, which are primary magnetic flux constant control and sensorless vector control. In the first embodiment, as an example, a description will be given on the basis of the sensorless vector control. Note that the control method described below can also be applied to the primary magnetic flux constant control with a minor change.

Next, a description will be given of characteristic operation of the control unit 400 in the first embodiment. First, the rectified current I1 flowing out from the rectifying unit 130 is affected by a power supply phase of the commercial power supply 110, characteristics of elements installed before and after the rectifying unit 130, and the like. As a result, the rectified current I1 has a characteristic of including a power-supply frequency and harmonic components of the power-supply frequency. The power-supply frequency is a frequency of the power-supply voltage $V_{in}$. In a case where the commercial power supply 110 has a single phase, twice the power-supply frequency is dominant in the harmonic components of the power-supply frequency. In addition, in a case where the commercial power supply 110 has three phases, six times the power-supply frequency is dominant in the harmonic components of the power-supply frequency.

In addition, in the capacitor 210, when the capacitor current I3 is large, aged deterioration of the capacitor 210 is accelerated. In particular, in a case where an electrolytic capacitor is used as the capacitor 210, a degree of acceleration of aged deterioration increases. Thus, the control unit 400 controls the inverter 310 so that the inverter input current I2 is equal to the rectified current I1 to perform control to bring the capacitor current I3 close to zero. As a result, deterioration of the capacitor 210 is reduced. However, a ripple component caused by pulse width modulation (PWM) is superimposed on the inverter input current I2. For this reason, the control unit 400 needs to control the inverter 310 in consideration of the ripple component. The control unit 400 controls the inverter 310 so that a value obtained by removing the PWM ripple from the inverter input current I2 from the capacitor 210 to the inverter 310 matches the rectified current I1 to apply pulsation to the power output to the motor 314. The control unit 400 performs pulsation compensation control for reducing pulsation of the capacitor current I3 by appropriately causing the inverter input current I2 to pulsate.

As described above, in the first embodiment, the control unit 400 performs pulsation compensation control on the capacitor 210. The pulsation compensation control is compensation control performed to reduce a pulsatile component included in the capacitor current I3. The pulsation compensation control can be performed on the basis of at least one detection value of the rectified current I1, the inverter input current I2, the capacitor current I3, the power-supply voltage $V_{in}$, and the capacitor voltage $V_{dc}$, all of which are information for grasping the power state of the capacitor 210. Under the pulsation compensation control, a current including a pulsatile component of twice the power-supply frequency (in a case where the commercial power supply 110 has a single phase) or six times the power-supply frequency (in a case where the commercial power supply 110 has three phases) flows through the motor 314. That is, a current including a pulsatile component having a frequency obtained by multiplying the power-supply frequency by a specific integer flows through the motor 314 under the pulsation compensation control.

Figure 2:
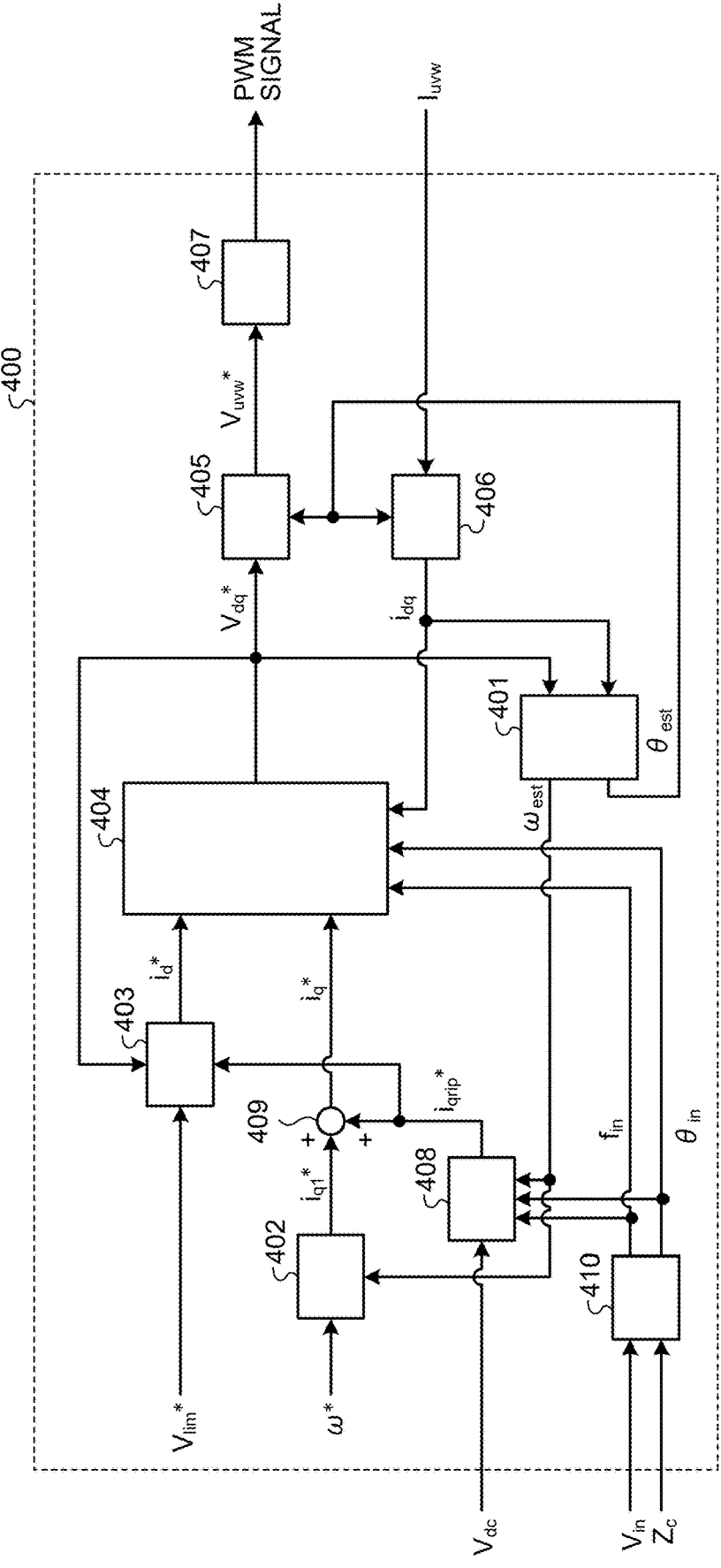
FIG. 2 is a block diagram illustrating a configuration example of a control unit included in the power conversion apparatus according to the first embodiment.

Next, a description will be given of a configuration of the control unit 400 that implements the above-described functions. FIG. 2 is a block diagram illustrating a configuration example of the control unit 400 included in the power conversion apparatus 1 according to the first embodiment. The control unit 400 includes a rotor position estimation unit 401, a speed control unit 402, a flux weakening control unit 403, a current control unit 404, coordinate transformation units 405 and 406, a PWM signal generation unit 407, a q-axis current pulsation calculation unit 408, an addition unit 409, and a frequency and phase calculation unit 410.

Using a dq-axis voltage command vector $V_{dq}*$ and a dq-axis current vector $i_{dq}$ for driving the motor 314, the rotor position estimation unit 401 estimates an estimated phase angle $\theta_{est}$ that is a direction in a dq-axis of a rotor magnetic pole, and an estimated speed $\omega_{est}$ that is a rotor speed, for a rotor (not illustrated) included in the motor 314.

The speed control unit 402 automatically adjusts a q-axis current command $i_{q1}*$ so that a speed command $\omega*$ matches the estimated speed $\omega_{est}$. In a case where the power conversion apparatus 1 is used as a refrigeration cycle application device in an air conditioner or the like, the speed command $\omega*$ is based on, for example, a temperature detected by a temperature sensor (not illustrated), information indicating a set temperature for which an instruction is given from a remote controller that is an operation unit (not illustrated), operation mode selection information, operation start and operation end instruction information, and the like. The operation mode is, for example, heating, cooling, dehumidification, or the like.

The flux weakening control unit 403 automatically adjusts a d-axis current command $i_d*$ so that an absolute value of the dq-axis voltage command vector $V_{dq}*$ falls within a limit value of a voltage limit value $V_{lim}*$. In addition, in the first embodiment, the flux weakening control unit 403 performs flux weakening control in consideration of a q-axis current pulsation command $i_{qrip}*$ calculated by the q-axis current pulsation calculation unit 408. There are roughly two types of flux weakening control, which are a method of calculating the d-axis current command $i_d*$ from an equation of a voltage limit ellipse and a method of calculating the d-axis current command $i_d*$ so that a deviation of an absolute value between the voltage limit value $V_{lim}*$ and the dq-axis voltage command vector $V_{dq}*$ is zero, but either method may be used.

The frequency and phase calculation unit 410 calculates a power-supply frequency $f_{in}$ and a power supply phase $\theta_{in}$ on the basis of the detection value of the power-supply voltage $V_{in}$ detected by the voltage detecting unit 140 and the zero-cross signal $Z_c$ generated by the zero-cross detecting unit 142. The power-supply frequency $f_{in}$ is a frequency of the power-supply voltage $V_{in}$, and the power supply phase $\theta_{in}$ is a phase of the power-supply voltage $V_{in}$. Note that, in this description, the power-supply frequency $f_{in}$ and the power supply phase $\theta_{in}$ calculated by the frequency and phase calculation unit 410 may be referred to as a "detection value of the power-supply frequency $f_{in}$" and a "detection value of the power supply phase $\theta_{in}$", respectively.

On the basis of the power-supply frequency $f_{in}$ and the power supply phase $\theta_{in}$ calculated by the frequency and phase calculation unit 410, the current control unit 404 automatically adjusts the dq-axis voltage command vector $V_{dq}*$ so that the dq-axis current vector $i_{dq}$ follows the d-axis current command $i_d*$ and the q-axis current command $i_q*$.

The coordinate transformation unit 405 performs coordinate transformation of the dq-axis voltage command vector $V_{dq}*$ from dq coordinates into a voltage command $V_{uvw}*$ that is an AC amount according to the estimated phase angle $\theta_{est}$.

The coordinate transformation unit 406 performs coordinate transformation of a current $I_{uvw}$ flowing through the motor 314 from an AC amount into the dq-axis current vector $i_{dq}$ of the dq coordinates according to the estimated phase angle $\theta_{est}$. As described above, regarding the current $I_{uvw}$ flowing through the motor 314, the control unit 400 can acquire current values of two phases detected by the current detecting units 313a and 313b among the current values of three phases output from the inverter 310, and a current value of the remaining one phase by using the current values of the two phases.

The PWM signal generation unit 407 generates a PWM signal on the basis of the voltage command $V_{uvw}*$ obtained by coordinate transformation by the coordinate transformation unit 405. The control unit 400 applies a voltage to the motor 314 by outputting the PWM signal generated by the PWM signal generation unit 407 to the switching elements 311a to 311f of the inverter 310.

The q-axis current pulsation calculation unit 408 calculates the q-axis current pulsation command $i_{qrip}*$ on the basis of the power-supply frequency $f_{in}$ and the power supply phase $\theta_{in}$ calculated by the frequency and phase calculation unit 410, the detection value of the capacitor voltage $V_{dc}$ detected by the voltage detecting unit 503, and the estimated speed $\omega_{est}$.

The addition unit 409 adds the q-axis current command $i_{q1}*$ output from the speed control unit 402 and the q-axis current pulsation command $i_{qrip}*$ calculated by the q-axis current pulsation calculation unit 408, and outputs the q-axis current command $i_q*$ that is a calculated value of the addition as a torque current command to the current control unit 404.

Figure 3:
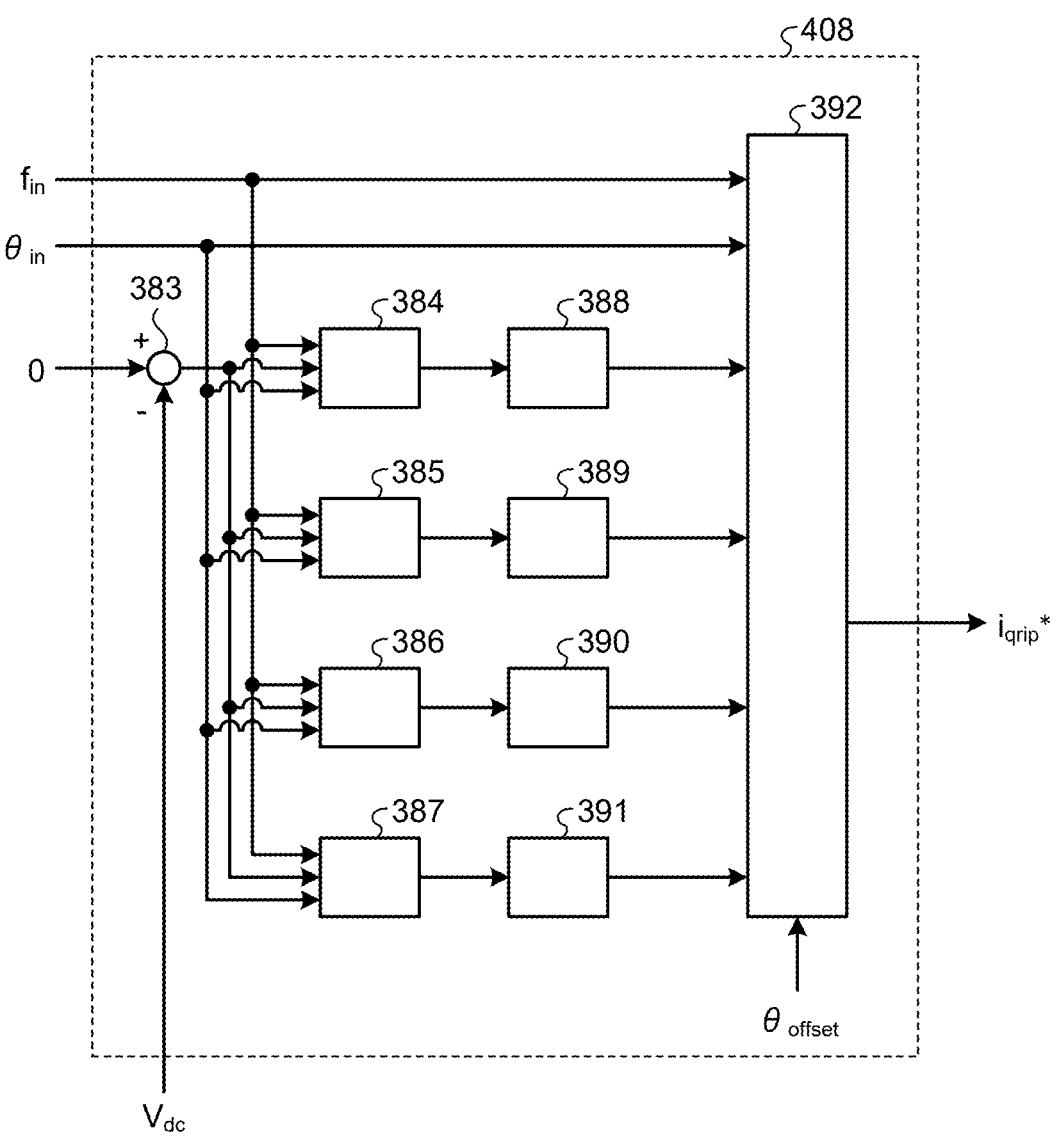
FIG. 3 is a diagram illustrating a configuration example of a q-axis current pulsation calculation unit included in the control unit according to the first embodiment.

FIG. 3 is a diagram illustrating a configuration example of the q-axis current pulsation calculation unit 408 included in the control unit 400 according to the first embodiment. The q-axis current pulsation calculation unit 408 is configured as a feedback controller in which a command value is set to zero. Usually, a feedback controller has a lower control response than a feedforward controller and is not suitable for reducing high-frequency pulsation, but various high-frequency pulsation reduction means have been proposed in the past. As a well-known method, there is a method using Fourier coefficient calculation and a proportional integral differential (PID) controller. The q-axis current pulsation calculation unit 408 includes a subtraction unit 383, Fourier coefficient calculation units 384 to 387, PID control units 388 to 391, and an AC restoration unit 392.

The subtraction unit 383 calculates a deviation between the command value that is zero and the capacitor voltage $V_{dc}$. By using the theory of Fourier series expansion, it is possible to extract amplitudes of a sin signal component and a cos signal component of a specific frequency included in the deviation. Assuming that the power-supply frequency is a 1f component, the Fourier coefficient calculation units 384 to 387 calculate amplitudes of a sin 2f component, a cos 2f component, a sin 4f component, and a cos 4f component included in the deviation, respectively. Detection signals multiplied in the Fourier coefficient calculation units 384 to 387 are represented by $\sin 2(2\pi f_{in}t+\theta_{in})$, $\cos 2(2\pi f_{in}t+\theta_{in})$, $\sin 4(2\pi f_{in}t+\theta_{in})$, and $\cos 4(2\pi f_{in}t+\theta_{in})$, respectively, using time t and the power-supply frequency $f_{in}$. In addition, in the detection signals, twice an average value of products of input signals and the detection signals is an amplitude of the sin 2f component, the cos 2f component, the sin 4f component, and the cos 4f component included in the deviation. That is, the Fourier coefficient calculation units 384 to 387 calculate the amplitudes of the components according to the power-supply frequency $f_{in}$ of the commercial power supply 110, included in the deviation between the detection value and the command value. If the capacitor current I3 has a periodic waveform, output signals of the Fourier coefficient calculation units 384 to 387 are substantially constant.

The PID control units 388 to 391 perform proportional-integral-differential control, that is, PID control so that these specific frequency components of the deviation are respectively zero. A proportional gain and a differential gain may be zero, but a value of an integral gain needs to be non-zero in order to cause the deviation to converge to zero. For that reason, in the PID control units 388 to 391, integration operation is main operation. Normally, since an output of integral control changes gently, outputs of the PID control units 388 to 391 can also be regarded as substantially constant.

Here, the capacitor voltage $V_{dc}$ is obtained by dividing charges accumulated by the capacitor current I3, that is, an integral value of the capacitor current I3 by the capacitance of the capacitor 210. For this reason, there is a phase difference of 90 degrees between the capacitor current I3 and the capacitor voltage $V_{dc}$. Thus, the AC restoration unit 392 needs to determine the q-axis current pulsation command $i_{qrip}*$ in consideration of the phase difference of 90 degrees. In a case where the phase difference of 90 degrees is $\theta_{offset}$ ($=\pi/2$ [rad]), the AC restoration unit 392 performs restoration calculation as follows.

First, as described above, the detection signals multiplied in the Fourier coefficient calculation units 384 to 387 are $\sin 2(2\pi f_{in}t+\theta_{in})$, $\cos 2(2\pi f_{in}t+\theta_{in})$, $\sin 4(2\pi f_{in}t+\theta_{in})$, and $\cos 4(2\pi f_{in}t+\theta_{in})$, respectively. In order to restore the outputs of the PID control units 388 to 391 to AC components, the AC restoration unit 392 performs multiplication by $\sin 2(2\pi f_{in}t+\theta_{in}+\theta_{offset})$, $\cos 2(2\pi f_{in}t+\theta_{in}+\theta_{offset})$, $\sin 4(2\pi f_{in}t+\theta_{in}+\theta_{offset})$, and $\cos 4(2\pi f_{in}t+\theta_{in}+\theta_{offset})$ obtained by shifting restoration signals by the phase difference $\theta_{offset}$, and then adds multiplication results together to determine the q-axis current pulsation command $i_{qrip}*$. In this manner, the AC restoration unit 392 generates the q-axis current pulsation command $i_{qrip}$* that is a command for pulsation to reduce the capacitor current I3.

Here, a case has been exemplified where the sensorless vector control method is used, but the present invention can also be applied to the primary magnetic flux constant control by making some modifications to add pulsation to a speed command, a voltage command, and the like.

Figure 4:
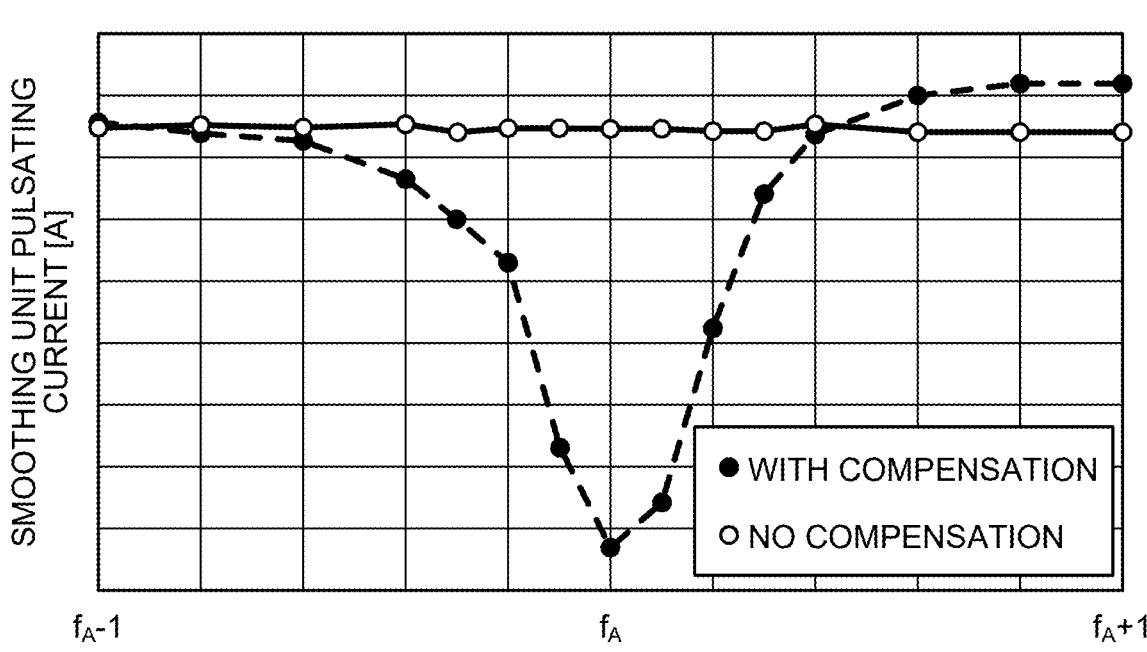
FIG. 4 is a diagram illustrating an example of a relationship between a smoothing unit pulsating current and a power-supply frequency in the power conversion apparatus according to the first embodiment.

FIG. 4 is a diagram illustrating an example of a relationship between a smoothing unit pulsating current and the power-supply frequency $f_{in}$ in the power conversion apparatus 1 according to the first embodiment. The smoothing unit pulsating current indicated by the vertical axis is an effective value or an average value of the pulsatile component included in the capacitor current I3 that is a current flowing through the smoothing unit 200. The horizontal axis in FIG. 4 represents the power-supply frequency $f_{in}$. In a case where the frequency of the commercial power supply 110 is 50 [Hz], $f_A$=50, and in a case where the frequency of the commercial power supply 110 is 60 [Hz], $f_A$=60. In FIG. 4, a plot connected by a solid line represents the smoothing unit pulsating current in a case where a pulsation compensation control function by the q-axis current pulsation calculation unit 408 is not activated, and a plot connected by a broken line represents the smoothing unit pulsating current in a case where the pulsation compensation control function by the q-axis current pulsation calculation unit 408 is activated. Further, in a characteristic illustrated in FIG. 4, it is assumed that, inside the control unit 400, processing of the pulsation compensation control is performed on a premise that the frequency of the commercial power supply 110 does not change, that is, a frequency used in the pulsation compensation control is constant $f_A$.

As can be seen from the characteristic of FIG. 4, in a case where the actual power-supply frequency $f_{in}$ is the frequency $f_A$ used in the pulsation compensation control or a value close to the frequency $f_A$, an effect of reducing the smoothing unit pulsating current is high. On the other hand, in a case where there is a deviation between the actual power-supply frequency $f_{in}$ and the frequency $f_A$ used in the pulsation compensation control, it can be seen that the effect of reducing the smoothing unit pulsating current decreases according to an amount of the deviation. However, it goes without saying that the reduction effect and the amount of deviation change depending on a control setting condition or an operating condition. In addition, FIG. 4 indicates that in a case where a difference between the actual power-supply frequency $f_{in}$ and the frequency $f_A$ used in the pulsation compensation control is −1 [Hz], only the same reduction effect can be obtained as the case where the pulsation compensation control function is not activated. In addition, FIG. 4 indicates that in a case where the difference between the actual power-supply frequency $f_{in}$ and the frequency $f_A$ used in the pulsation compensation control is +1 [Hz], the reduction effect is worse than the case where the pulsation compensation control function is not activated.

From the above, in an environment where fluctuation of the power-supply frequency $f_{in}$ is large, it is effective to adjust the frequency $f_A$ used in the pulsation compensation control to the actual power-supply frequency $f_{in}$. For this reason, in the control unit 400 according to the first embodiment, a configuration is made in which the power-supply frequency $f_{in}$ and the power supply phase $\theta_{in}$ are calculated by the frequency and phase calculation unit 410, and the calculated power-supply frequency $f_{in}$ and power supply phase $\theta_{in}$ are input to the q-axis current pulsation calculation unit 408.

FIG. 5 is a flowchart for explaining frequency setting processing performed inside the control unit 400 according to the first embodiment.

First, the control unit 400 determines whether or not a current status is the time of activation (step S11). If it is the time of activation (step S11, Yes), the control unit 400 determines the frequency of the commercial power supply 110 (step S12), and sets the determined frequency as the set frequency (step S13). For example, if a place of use of the power conversion apparatus 1 is Japan, the control unit 400 determines whether the frequency of the commercial power supply 110 is 50 [Hz] or 60 [Hz], and either 50 [Hz] or 60 [Hz] is set as an initial value of the set frequency. Note that the above-described pulsation compensation control is performed on the basis of the set frequency.

Returning to step S11, in a case where the current status is not the time of activation (step S11, No), the control unit 400 confirms the detection value of the power-supply frequency $f_{in}$ (step S14), and further compares an absolute value of a difference between the detection value of the power-supply frequency $f_{in}$ and the set frequency with a threshold B (step S15).

In a case where the absolute value of the difference between the detection value of the power-supply frequency $f_{in}$ and the set frequency exceeds the threshold B (step S15, Yes), the set frequency is changed, that is, updated (step S16). In the processing of step S16, the detection value of the power-supply frequency $f_{in}$ confirmed in step S14 is set as a new set frequency. On the other hand, in a case where the absolute value of the difference between the detection value of the power-supply frequency $f_{in}$ and the set frequency does not exceed the threshold B (step S15, No), the current set frequency is maintained (step S17).

By performing the processing illustrated in the flowchart of FIG. 5, the appropriate power-supply frequency $f_{in}$ can be set according to an environmental condition of the power conversion apparatus 1. As a result, the effect of the pulsation compensation control in the power conversion apparatus 1 can be enhanced.

In the processing of steps S15 and S16 in FIG. 5, the detection value of the power-supply frequency $f_{in}$ is compared with the set frequency, whereby the set frequency is changed, but the processing is not limited thereto. Instead of the set frequency, a past detection value of the power-supply frequency $f_{in}$ may be set as a comparison target, whereby the set frequency may be changed. The past detection value may be an average value of a plurality of detection values obtained in the past, or may be a detection value obtained through filter processing with a low-pass filter or the like.

The power conversion apparatus 1 according to the first embodiment operates under the control by the control unit 400 described above, and characteristics of the operation are as follows. First, the power conversion apparatus 1 operates so that a first difference frequency is within 1 [Hz], the first difference frequency being an absolute value of a difference between a frequency of a dominant pulsatile component included in the capacitor voltage $V_{dc}$ or the capacitor current I3 and a frequency obtained by multiplying the detection value of the power-supply frequency $f_{in}$ by a specific integer. With this operation, the effect of the pulsation compensation control in the power conversion apparatus 1 can be enhanced. In order to operate the power conversion apparatus 1 so that the first difference frequency is within 1 [Hz], it is only required to appropriately set the threshold B used in step S15 of FIG. 5. As can be understood from the characteristic illustrated in FIG. 4, the threshold B is a value smaller than 1 [Hz]. In addition, the first difference frequency is the absolute value of the difference from the frequency obtained by multiplying the detection value of the power-supply frequency $f_{in}$ by the specific integer, and the specific integer is, for example, two or six, so that the threshold B is a value smaller than 0.5 [Hz]. Note that it goes without saying that the threshold B should be changed depending on whether the commercial power supply 110 has a single phase or three phases.

In addition, the power conversion apparatus 1 operates so that a second difference frequency is within 1 [Hz], the second difference frequency being an absolute value of a difference between the set frequency and a frequency of a dominant pulsatile component included in the motor current flowing through the motor 314. With this operation, the effect of the pulsation compensation control in the power conversion apparatus 1 can be enhanced. In order to operate the power conversion apparatus 1 so that the second difference frequency is within 1 [Hz], it is only required to appropriately set the threshold B used in step S15 of FIG. 5. Items to be considered when the threshold B is appropriately set are as described above.

Note that, in a case where the function of the pulsation compensation control in the first embodiment acts effectively, the power conversion apparatus 1 operates so that the first or second difference frequency changes depending also on the operating condition for the device. In a case where an example of the device is a compressor, a suction pressure and a discharge pressure of the compressor 315, a temperature of a refrigerant, a target value of an indoor temperature of an air conditioner, and the like correspond to the operating conditions described herein. By confirming a change in the first or second difference frequency when at least one of these operating conditions is changed, the power conversion apparatus 1 can determine whether the function of the pulsation compensation control in the power conversion apparatus 1 is normal.

Figure 6:
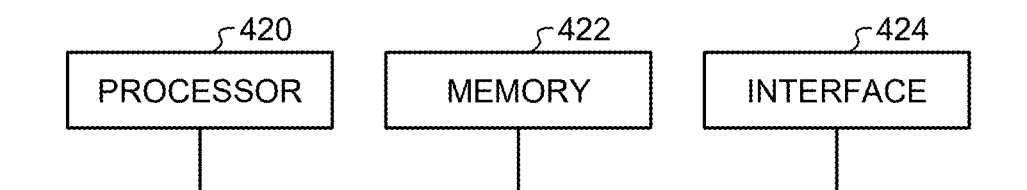
FIG. 6 is a block diagram illustrating an example of a hardware configuration that implements functions of the control unit according to the first embodiment.
Figure 7:
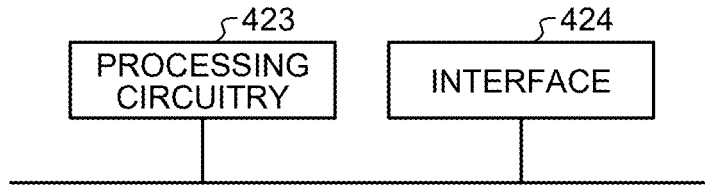
FIG. 7 is a block diagram illustrating another example of the hardware configuration that implements the functions of the control unit according to the first embodiment.

Next, a description will be given of a hardware configuration for implementing functions of the control unit 400 according to the first embodiment with reference to the drawings of FIGS. 6 and 7. FIG. 6 is a block diagram illustrating an example of a hardware configuration that implements the functions of the control unit 400 according to the first embodiment. FIG. 7 is a block diagram illustrating another example of the hardware configuration that implements the functions of the control unit 400 according to the first embodiment.

In order to implement some or all of the functions of the control unit 400, as illustrated in FIG. 6, a configuration can be made including a processor 420 that performs calculation, a memory 422 that stores a program read by the processor 420, and an interface 424 that inputs and outputs signals.

The processor 420 is an example of a calculation means. The processor 420 may be a calculation means called a microprocessor, a microcomputer, a central processing unit (CPU), or a digital signal processor (DSP). In addition, examples of the memory 422 include a nonvolatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, and a digital versatile disc (DVD).

The memory 422 stores a program for executing the functions of the control unit 400. The processor 420 exchanges necessary information via the interface 424, and the processor 420 executes the program stored in the memory 422, thereby being able to execute the above-described processing. Calculation results by the processor 420 can be stored in the memory 422.

In addition, the processor 420 and the memory 422 illustrated in FIG. 6 may be replaced with processing circuitry 423 as illustrated in FIG. 7. The processing circuitry 423 corresponds to a single circuit, a composite circuit, an application specific integrated circuit (ASIC), a field-programmable gate array (FPGA), or a combination thereof. Information input to the processing circuitry 423 and information output from the processing circuitry 423 can be obtained via the interface 424.

Note that some processing in the control unit 400 may be performed by the processing circuitry 423, and processing not performed by the processing circuitry 423 may be performed by the processor 420 and the memory 422.

As described above, the power conversion apparatus according to the first embodiment performs the pulsation compensation control for reducing the pulsatile component of the capacitor current that is the charge and discharge current of the capacitor on the basis of the detection value of the power-supply voltage. As a result, a ripple change in the capacitor voltage can be reduced, so that deterioration of the capacitor can be reduced. In addition, since the ripple change in the capacitor voltage can be reduced without an increase in the capacitance of the capacitor, it is possible to prevent an increase in size of the apparatus while reducing deterioration of the capacitor.

In addition, when the pulsation compensation control is performed in a state where the frequency used in the pulsation compensation control is fixed in an environment where the fluctuation of the power-supply frequency is large, the effect of reducing the smoothing unit pulsating current is reduced. On the other hand, the power conversion apparatus according to the first embodiment calculates the power-supply frequency on the basis of the detection value of the power-supply voltage to set the calculated frequency as the detection value of the power-supply frequency, and performs the pulsation compensation control on the basis of the set frequency set on the basis of the detection value. That is, since the power conversion apparatus according to the first embodiment is configured to be enabled to change the frequency used in the pulsation compensation control, the effect of reducing the smoothing unit pulsating current can be held to be high even in an environment where the fluctuation of the power-supply frequency is large. In addition, since the power conversion apparatus is configured to be enabled to change the frequency used in the pulsation compensation control, it is possible to minimize design change of the control unit even in a case where a type of the commercial power supply is different. As a result, it is possible to reduce an increase in manufacturing cost.

Second Embodiment

Figure 8:
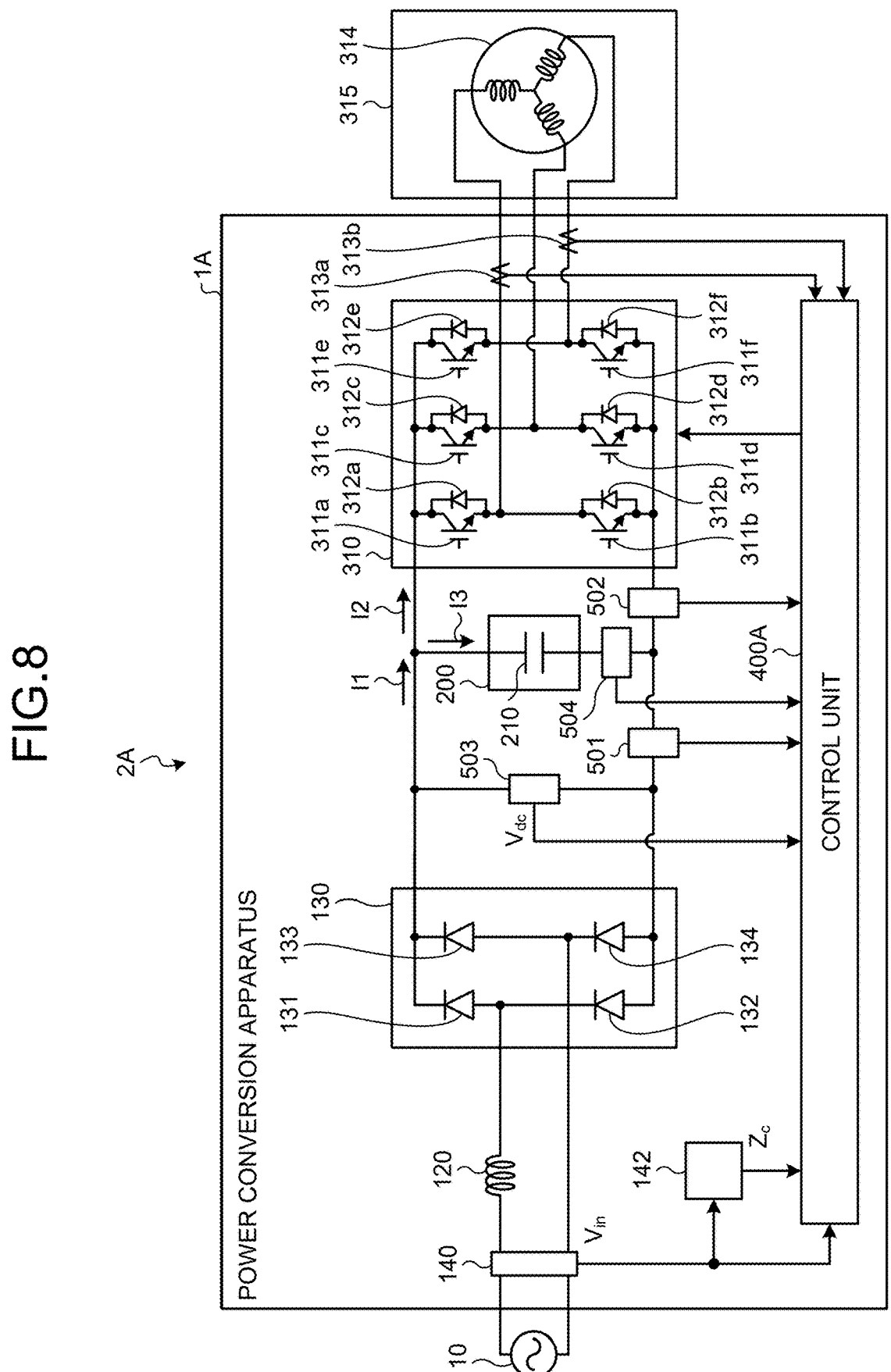
FIG. 8 is a diagram illustrating a configuration example of a power conversion apparatus according to a second embodiment.

FIG. 8 is a diagram illustrating a configuration example of a power conversion apparatus 1A according to a second embodiment. In the power conversion apparatus 1A illustrated in FIG. 8, the control unit 400 is replaced with a control unit 400A. The power conversion apparatus 1A and the motor 314 included in the compressor 315 constitute a motor drive apparatus 2A. In addition, a current detecting unit 504 that detects the capacitor current I3 is added to the power conversion apparatus 1A. The detection value of the capacitor current I3 detected by the current detecting unit 504 is input to the control unit 400A. The other configuration is the same as or equivalent to that of the power conversion apparatus 1 illustrated in FIG. 1, and the same or equivalent components are denoted by the same reference signs, and redundant description is omitted. Note that, in this description, the current detecting unit 504 that detects the capacitor current I3 may be referred to as the "second detecting unit" together with the voltage detecting unit 503 that detects the capacitor voltage $V_{dc}$, the current detecting unit 501 that detects the rectified current I1, and the current detecting unit 502 that detects the inverter input current I2.

Figure 9:
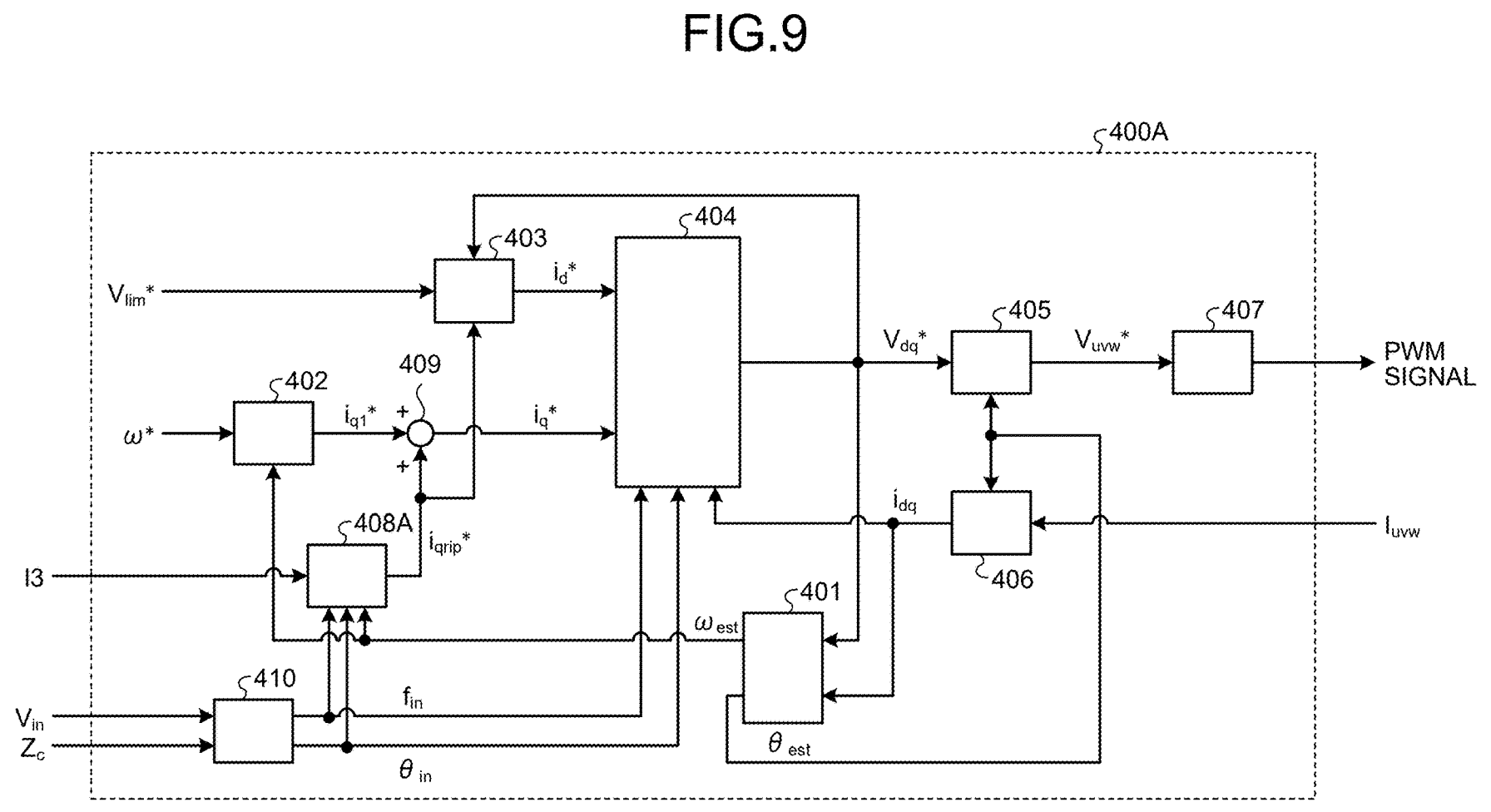

FIG. 9 is a block diagram illustrating a configuration example of the control unit 400A included in the power conversion apparatus 1A according to the second embodiment. In the control unit 400A illustrated in FIG. 9, as compared with the control unit 400 illustrated in FIG. 2, the q-axis current pulsation calculation unit 408 is replaced with a q-axis current pulsation calculation unit 408A. The detection value of the capacitor current I3 is input to the q-axis current pulsation calculation unit 408A. The other configuration is the same as or equivalent to that of the control unit 400 illustrated in FIG. 2, and the same or equivalent components are denoted by the same reference signs, and redundant description is omitted.

Figure 10:
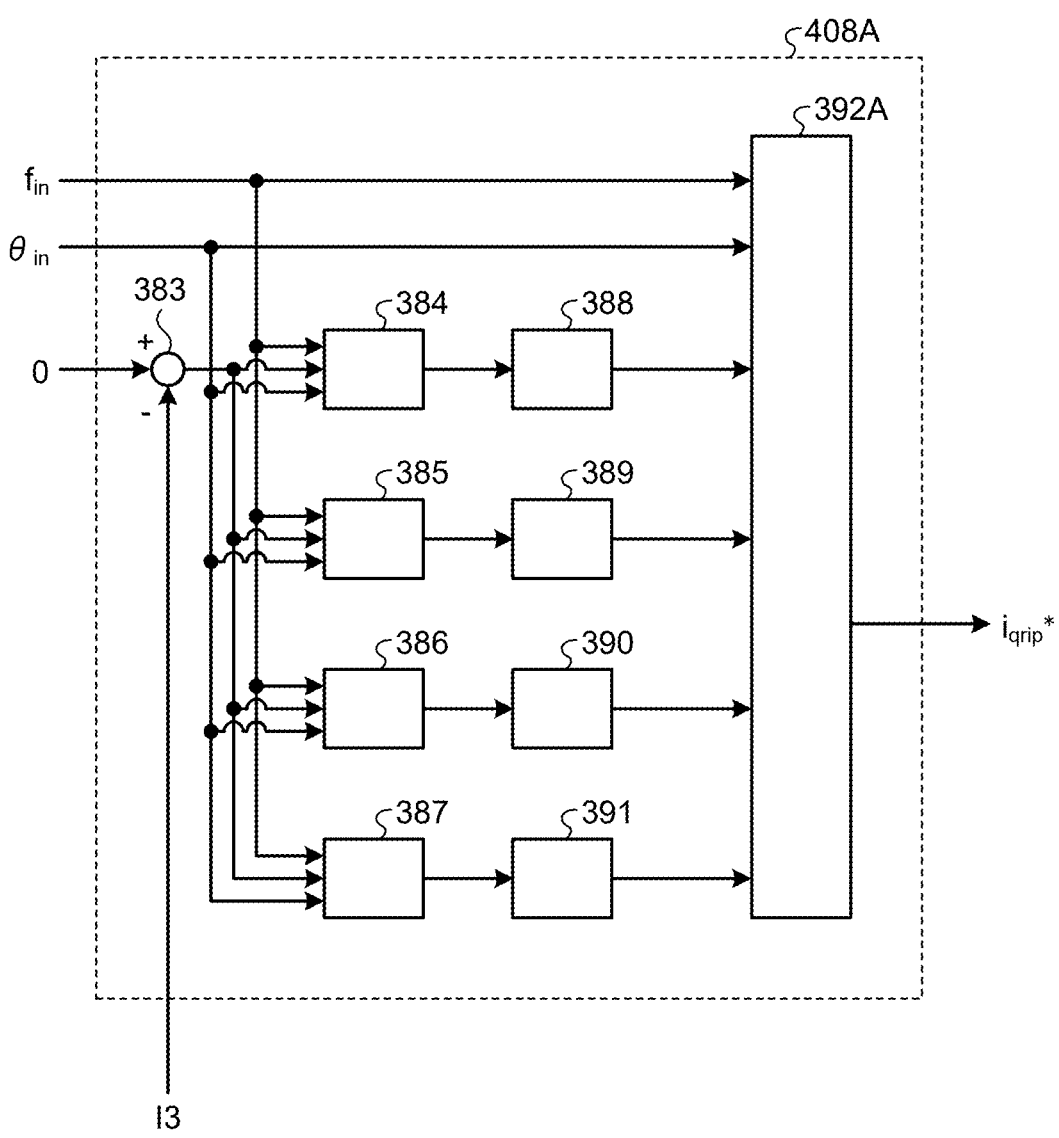
FIG. 10 is a diagram illustrating a configuration example of a q-axis current pulsation calculation unit included in a control unit according to the second embodiment.

FIG. 10 is a diagram illustrating a configuration example of the q-axis current pulsation calculation unit 408A included in the control unit 400A according to the second embodiment. In the q-axis current pulsation calculation unit 408A illustrated in FIG. 10, as compared with the q-axis current pulsation calculation unit 408 illustrated in FIG. 3, the AC restoration unit 392 is replaced with an AC restoration unit 392A. In addition, the detection value of the capacitor current I3 is input to the subtraction unit 383. In addition, in FIG. 10, the phase difference $\theta_{offset}$ that has been an input signal to the AC restoration unit 392 is deleted. The other configuration is the same as or equivalent to that of the q-axis current pulsation calculation unit 408 illustrated in FIG. 3, and the same or equivalent components are denoted by the same reference signs, and redundant description is omitted.

The subtraction unit 383 calculates a deviation between the command value that is zero and the detection value of the capacitor current I3. Similarly to the first embodiment, the Fourier coefficient calculation units 384 to 387 calculate the amplitudes of the components according to the power-supply frequency $f_{in}$ of the commercial power supply 110, included in the deviation between the detection value and the command value. The PID control units 388 to 391 perform PID control so that these specific frequency components of the deviation are respectively zero.

Here, in the second embodiment, since the detection value of the capacitor current I3 is used, information on the phase difference $\theta_{offset}$ used in the first embodiment is unnecessary. Thus, in order to restore the outputs of the PID control units 388 to 391 to AC components, the AC restoration unit 392A performs multiplication by sin $2(2\pi f_{in}t+\theta_{in})$, cos $2(2\pi f_{in}t+\theta_{in})$, sin $4(2\pi f_{in}t+\theta_{in})$, and cos $4(2\pi f_{in}t+\theta_{in})$ and then adds multiplication results together to determine the q-axis current pulsation command $i_{qrip}*$. In this manner, the AC restoration unit 392A generates the q-axis current pulsation command $i_{qrip}*$ that is a command for pulsation to reduce the capacitor current I3. Note that the other operation is similar to that in the first embodiment, and redundant description is omitted.

According to the second embodiment, since the q-axis current pulsation command $i_{qrip}*$ is calculated with use of the detection value of the capacitor current I3, processing by the q-axis current pulsation calculation unit 408A can be simplified as compared with processing by the q-axis current pulsation calculation unit 408 described in the first embodiment. Thus, a calculation load in the processor 420 or the processing circuitry 423 can be reduced. As a result, it is possible to obtain an effect of facilitating task design in the processor 420 or the processing circuitry 423 while having the effect of the first embodiment.

In the second embodiment, a configuration has been described in which the capacitor current I3 is detected by the current detecting unit 504; however, the present disclosure is not limited to this configuration. The capacitor current I3 may be obtained by calculation with the detection value of the rectified current I1 detected by the current detecting unit 501 and the detection value of the inverter input current I2 detected by the current detecting unit 502. Even in this case, the effect of the second embodiment described above can be obtained.

Third Embodiment

Figure 11:
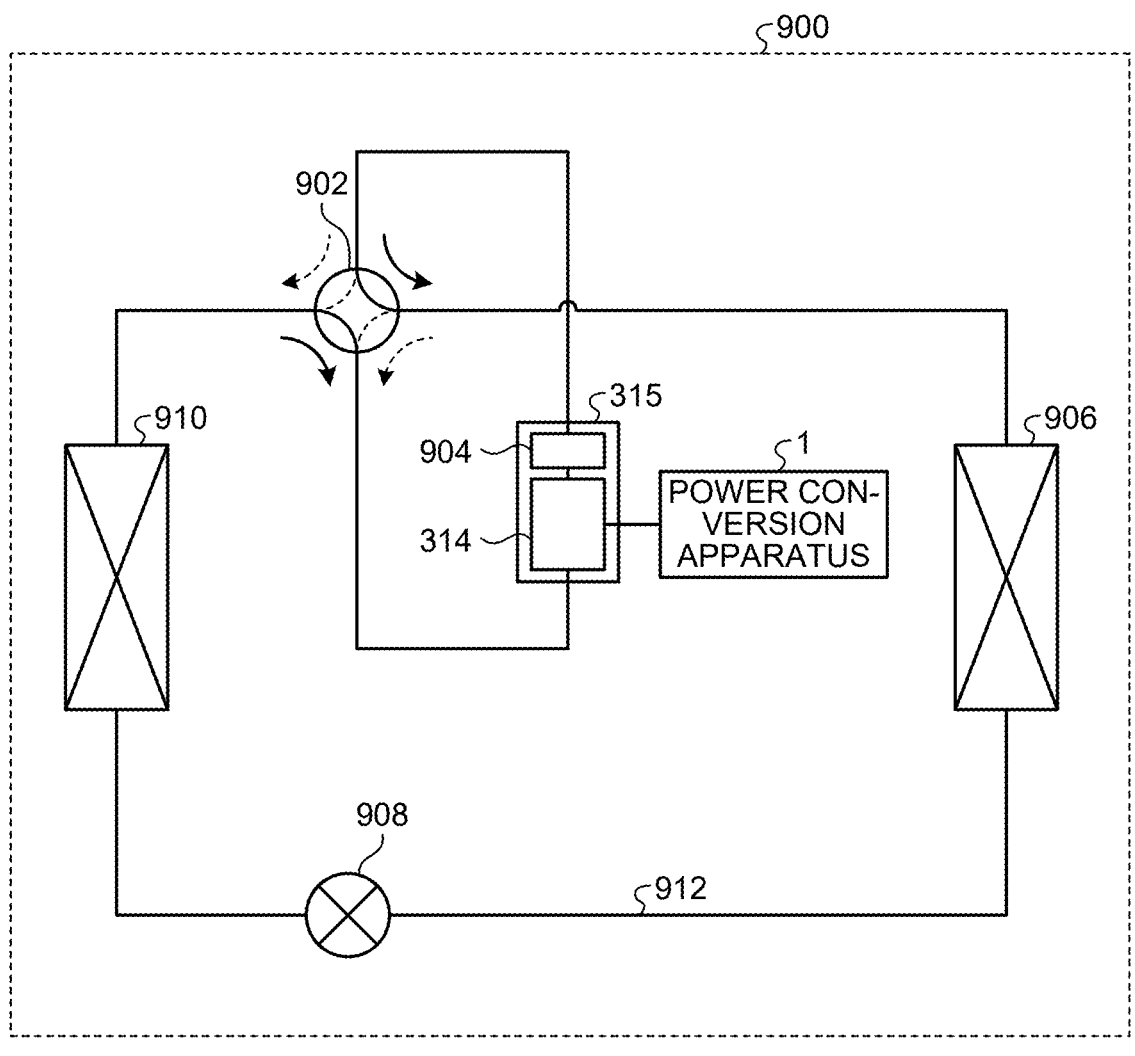
FIG. 11 is a diagram illustrating a configuration example of a refrigeration cycle application device according to a third embodiment.

FIG. 11 is a diagram illustrating a configuration example of a refrigeration cycle application device 900 according to a third embodiment. The refrigeration cycle application device 900 according to the third embodiment includes the power conversion apparatus 1 described in the first embodiment. The refrigeration cycle application device 900 according to the third embodiment can be applied to a product having a refrigeration cycle, such as an air conditioner, a refrigerator, a freezer, or a heat pump water heater. In FIG. 11, components having functions similar to those in the first embodiment are denoted by the same reference signs as those in the first embodiment.

The refrigeration cycle application device 900 includes the compressor 315 incorporating the motor 314 in the first embodiment, a four-way valve 902, an indoor heat exchanger 906, an expansion valve 908, and an outdoor heat exchanger 910, which are attached via a refrigerant pipe 912.

A compression mechanism 904 that compresses a refrigerant and the motor 314 that operates the compression mechanism 904 are provided inside the compressor 315.

The refrigeration cycle application device 900 can perform heating operation or cooling operation by switching operation of the four-way valve 902. The compression mechanism 904 is driven by the motor 314 subjected to variable-speed control.

During the heating operation, as indicated by solid arrows, the refrigerant is pressurized and sent out by the compression mechanism 904, and returns to the compression mechanism 904 through the four-way valve 902, the indoor heat exchanger 906, the expansion valve 908, the outdoor heat exchanger 910, and the four-way valve 902.

During the cooling operation, as indicated by broken arrows, the refrigerant is pressurized and sent out by the compression mechanism 904, and returns to the compression mechanism 904 through the four-way valve 902, the outdoor heat exchanger 910, the expansion valve 908, the indoor heat exchanger 906, and the four-way valve 902.

During the heating operation, the indoor heat exchanger 906 acts as a condenser to release heat, and the outdoor heat exchanger 910 acts as an evaporator to absorb heat. During the cooling operation, the outdoor heat exchanger 910 acts as a condenser to release heat, and the indoor heat exchanger 906 acts as an evaporator to absorb heat. The expansion valve 908 decompresses and expands the refrigerant.

Note that the refrigeration cycle application device 900 according to the third embodiment has been described as including the power conversion apparatus 1 described in the first embodiment, but is not limited thereto. The power conversion apparatus 1A described in the second embodiment may be used, or a power conversion apparatus other than the power conversion apparatuses 1 and 1A may be used as long as the control method described in the first and second embodiments can be applied.

The configurations described in the above embodiments are examples, and can be combined with another known technique, can be combined with each other, and a part of the configuration can be omitted or changed without departing from the gist.

REFERENCE SIGNS LIST

1, 1A power conversion apparatus; 2, 2A motor drive apparatus; 110 commercial power supply; 120 reactor; 130 rectifying unit; 131 to 134 rectifying element; 140, 503 voltage detecting unit; 142 zero-cross detecting unit; 200 smoothing unit; 210 capacitor; 310 inverter; 311a to 311f switching element; 312a to 312f freewheeling diode; 313a, 313b, 501, 502, 504 current detecting unit; 314 motor; 315 compressor; 383 subtraction unit; 384 to 387 Fourier coefficient calculation unit; 388 to 391 PID control unit; 392, 392A AC restoration unit; 400, 400A control unit; 401 rotor position estimation unit; 402 speed control unit; 403 flux weakening control unit; 404 current control unit; 405, 406 coordinate transformation unit; 407 PWM signal generation unit; 408, 408A q-axis current pulsation calculation unit; 409 addition unit; 410 frequency and phase calculation unit; 420 processor; 422 memory; 423 processing circuitry; 424 interface; 900 refrigeration cycle application device; 902 four-way valve; 904 compression mechanism; 906 indoor heat exchanger; 908 expansion valve; 910 outdoor heat exchanger; 912 refrigerant pipe.

The invention claimed is:

1. A power conversion apparatus comprising:
a rectifying unit rectifying a power-supply voltage applied from an AC power supply;
a capacitor connected to an output end of the rectifying unit;
an inverter connected across the capacitor, the inverter converting DC power output from the capacitor into AC power and outputting the AC power to a device on which a motor is mounted;
a first detecting unit detecting the power-supply voltage; and
a control unit calculating a power-supply frequency that is a frequency of the power-supply voltage on a basis of a detection value by the first detecting unit, setting the power-supply frequency as a detection value of the power-supply frequency, and performing, on a basis of a set frequency set on a basis of the detection value of the power-supply frequency, pulsation compensation control of reducing a pulsatile component of a capacitor current that is a charge and discharge current of the capacitor, wherein in a case where an absolute value of a difference between the detection value of the power-supply frequency and the set frequency exceeds a threshold, the detection value of the power-supply frequency is updated as a new set frequency, and
in a case where the absolute value of the difference between the detection value of the power-supply frequency and the set frequency does not exceed the threshold, a current set frequency is maintained.

2. The power conversion apparatus according to claim 1, wherein
a current including a pulsatile component having a frequency obtained by multiplying a power-supply frequency by a specific integer flows through the motor under the pulsation compensation control.

3. The power conversion apparatus according to claim 1, wherein
the set frequency is changed on a basis of the detection value of the power-supply frequency and an average value of a plurality of detection values of the power-supply frequency previously obtained.

4. The power conversion apparatus according to claim 1, wherein
a first difference frequency is within 1 [Hz], the first difference frequency being an absolute value of a difference between a frequency of a dominant pulsatile component included in the capacitor current and a frequency obtained by multiplying the detection value of the power-supply frequency by a specific integer.

5. The power conversion apparatus according to claim 1, wherein
a second difference frequency is within 1 [Hz], the second difference frequency being an absolute value of a difference between the set frequency and a frequency of a dominant pulsatile component included in a motor current flowing through the motor.

6. The power conversion apparatus according to claim 1, wherein
at least one of a first difference frequency or a second difference frequency changes depending on an operating condition for the device, the first difference frequency being an absolute value of a difference between a frequency of a dominant pulsatile component included in the capacitor current and a frequency obtained by multiplying the detection value of the power-supply frequency by a specific integer, the second difference frequency being an absolute value of a difference between the set frequency and a frequency of a dominant pulsatile component included in a motor current flowing through the motor.

7. A motor drive apparatus comprising the power conversion apparatus according to claim 1.

8. A refrigeration cycle application device comprising the power conversion apparatus according to claim 1.

* * * * *